United States Patent [19]

D'Atre et al.

[11] Patent Number: 4,764,713
[45] Date of Patent: Aug. 16, 1988

[54] METHOD FOR STARTING A VARIABLE VOLTAGE INVERTER WITH A PRE-SPINNING LOAD MOTOR

[75] Inventors: John D. D'Atre; William P. Giewont, both of Earlysville, Va.

[73] Assignee: General Electric Company, Charlottesville, Va.

[21] Appl. No.: 943,744

[22] Filed: Dec. 19, 1986

[51] Int. Cl.$^4$ .............................................. H02K 1/30
[52] U.S. Cl. ..................................... 318/778; 318/798
[58] Field of Search ........................ 318/778, 798, 806

[56] References Cited

U.S. PATENT DOCUMENTS

| | | | |
|---|---|---|---|
| 4,409,533 | 10/1983 | Kawabata | 318/778 |
| 4,417,193 | 11/1983 | Hirata | 318/806 |
| 4,451,112 | 5/1984 | Hattori et al. | 318/778 |
| 4,607,205 | 8/1986 | Kito et al. | 318/778 |
| 4,642,546 | 2/1987 | Schonherr | 318/798 |

Primary Examiner—David Smith, Jr.
Attorney, Agent, or Firm—James H. Beusse

[57] ABSTRACT

A method for providing a smooth transition to powered operation in a motor control system in which a variable voltage inverter regulates power to the motor on a volts per Hertz basis. The method is particularly applicable to systems for energizing and rapidly gaining control of a motor driving a load in which the motor armature is turning at the time that power is supplied from the variable voltage converter. The method is implemented by sweeping the frequency of the excitation applied to an alternating current motor while holding the magnitude of the excitation at a level sufficient to prevent over current excitation of the motor.

4 Claims, 2 Drawing Sheets

METHOD FOR STARTING A VARIABLE VOLTAGE INVERTER WITH A PRE-SPINNING LOAD MOTOR

FIELD OF THE INVENTION

This invention relates in general to energization of motors and more particularly to an improved method of starting a variable voltage inverter connected in driving relationship with a pre-spinning motor.

BACKGROUND OF THE INVENTION

When a large power step is suddenly applied to an alternating current (AC) motor, large torque transients may be developed. If the motor is connected in driving relationship to a load and the motor armature is rotating at some initial velocity, the sudden torque transient may result in damage or some other undesirable reaction on the load. Thus, it is desirable to apply power to a motor in a manner that avoids such undesirable effects. For a nonrotating motor, power may be simpled applied at some small voltage and low frequency to enable the motor to begin rotation. However, if the motor is spinning, i.e., the rotor is in motion, it is desirable to apply power at a voltage level and frequency which matches the motor speed in order to quickly gain control of motor operation. In particular, control systems utilizing volts per Hertz regulation have required knowledge of motor speed so as to properly adjust inverter frequency and converter voltage, to existing operating conditions. Should motor voltage be applied without first coordinating such voltage and frequency with motor conditions, excessive current and torque transients are known to result. Prior art solutions to this problem have required the use of a motor tachometer or other mechanical speed sensing devices to determine initial motor conditions.

Among the several objects of the present invention may be noted the provision of an improved method for starting a variable voltage inverter with a motor that may be pre-spinning; the provisions of this improved method including a means of achieving smooth starting conditions for an already spinning motor; the provision of such improved method in which both the volt-second set point and the DC link voltage are determined to match the existing motor rotational and excitation levels; the provision of such an improved method which renders mechanical monitoring devices unnecessary; the provision of an improved method which utilizes a voltage converter command in combination with an inverter volt-second command in order to gently achieve frequency lock consistent with the electrical frequency of a pre-spinning motor; the provisions of such improved method including the determination of voltage and frequency settings when a motor is spinning in the constant horsepower range; and the provisions of such method including reversal of inverter rotation phasing which is opposite to that required by a spinning motor.

In general an improved method is provided in one form of the invention for determining initial voltage and inverter frequency conditions in order to power a pre-spinning motor.

DETAILED DESCRIPTION OF THE PREFERRED EMBODIMENT

Figure 1:
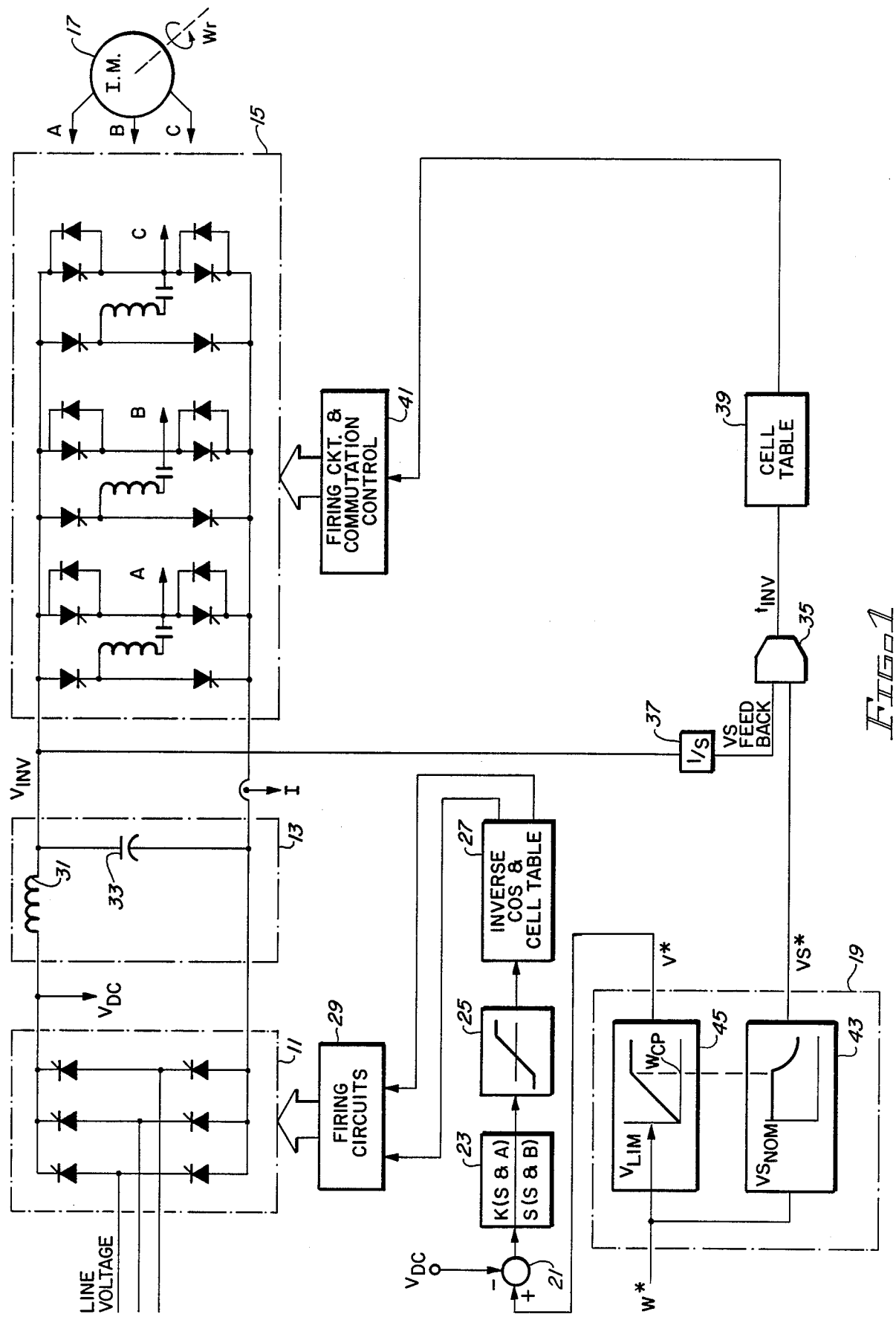
FIG. 1 illustrates a variable voltage inverter system in block form.

With reference to FIG. 1 there is illustrated a variable voltage inverter system. A 2-quadrant converter 11, which may comprise, by way of example, a combined full wave rectifier and chopper, converts 3-phase, 60 Hertz commercially available power into a controlled DC link voltage. Other various voltages and frequencies can serve as rectifier inputs. The illustrative converter 11 may comprise a full wave bridge rectifier of a type well known in the art employing a plurality of thyristors or other controlled switching devices, for regulating the DC voltage on DC link 13. The regulated DC link voltage is coupled to an inverter 15 of a type well known in the art which switches at a controlled rate to convert ("invert") the DC voltage to an alternating current (AC) voltage at a regulated frequency. The inverter 15 is connected to supply AC excitation to motor 17.

For volts per Hertz operation, inverter 15 converts the regulated DC link voltage to a frequency proportional to the link voltage. Since the rotational speed of an AC motor is regulated by the frequency of the applied voltage, assuming sufficient applied power, the motor speed in a volts per Hertz control system can be regulated by controlling the DC link voltage. In the illustrative system, an external command W* calls for a selected motor speed. A processor 19, which may be a microcomputer, converts the speed command into a corresponding DC link voltage command V*. The processor 19 then provides gating signals to the switching devices in converter 11 to establish the desired voltage on DC link 13. The processor 19 is also programmed to provide gating signals to inverter 15 in such a manner as to provide AC excitation to motor 17 at a frequency having a predetermined correspondence to the DC link voltage, i.e., at such a rate as to maintain a constant volts per Hertz relationship.

The motor control system of FIG. 1, with the exception of the functions illustrated in block 19, is of a type known in the art and will not be described in great detail. The voltage command V* which sets the voltage on DC link 13 during motoring is summed with the DC link voltage VDC in summing junction 21 to produce an error signal representative of the difference therebetween. The resultant error signal is coupled to a proportional plus integral control block 23 for generating a signal representative of the desired gating/conduction times of the SCR's in converter 11. This latter signal is processed through a limiting amplifier 25 which limits its maximum and minimum values. The signal is then coupled to a cell fire table 27 which converts the limited signal to appropriate gating signals representative of firing times (phase angles) and conductive cells. The gating signals are coupled through a firing circuit 29 which distributes the signals to appropriate ones of the SCR's in converter 11.

The DC link 13 is essentially a low pass filter having a series inductor 31 and a shunt capacitor 33. The capacitor 33 acts as a current source for inverter 15 since the converter 11 cannot instantaneously react to hold the link voltage constant when the inverter fires.

The inverter 15 is a common three-phase inverter using twelve SCR's and has the ability to carry reverse current (regenerative current) from motor 17 to capacitor 33. The converter 11 is a two-quadrant converter and cannot handle reverse current.

The control of inverter 15 is based on a volts per Hertz relationship and is implemented in response to a volt-second command signal VS* from processor 19. Under normal operating conditions, i.e., in the constant torque motor operating region, the VS* signal is a constant. A variable relationship with speed exists in the constant horsepower region. As will become apparent, Applicants' invention also changes the VS* command signal in order to catch a spinning motor. The VS* signal is coupled to a comparator circuit 35 where it is compared to a VS feedback signal. The VS feedback signal is derived from the DC link voltage sampled at the inverter input and coupled through limit circuit 37. For a commanded speed W* less than or equal to the boundary speed separating the constant volts per Hertz region from the constant horsepower region the VS signal is the integral of the inverter voltage when the integrated voltage reaches the proper volt second value, then the comparator 35 changes state to change the state of the signal to the cell fire table to sequence the cell table to the next step. In the constant horsepower region, VS is limited to a predetermined value. The output of divider circuit 35 is a signal $T_{INV}$ representative of times for an inverter state change. This $T_{INV}$ signal is coupled to a look-up table 39 which converts it to appropriate firing signal times and durations. The signals generated from the table 39 are coupled to a gate signal circuit 41 which provides appropriately sequenced firing signals to the individual components (SCR's) of the inverter 15.

For constant volts per second operation of motor 17, the frequency of the AC power applied to motor 17 is varied in response to the magnitude of the monitored link voltage $V_{INV}$. The graph 43 in processor block 19 indicates that for speeds less than or equal to the motor corner point, the VS* signal is constant. Thus, motor speed is controlled by variation in DC link voltage command V* which then effects a commanded frequency change. The graph 45 indicates that the V* signal varies linearly with speed command W* until the motor corner point (the constant horsepower region) is reached. At this point, V* is held constant and VS* is varied in an inverse relation.

For the case of a pre-spinning motor, the DC link voltage $V_{DC}$ commanded by processor 19 in response to the external speed command W* may be greater or less than a value of voltage corresponding to the present speed of the motor. For example, if the motor is spinning faster than the commanded speed, gating of the inverter 15 will result in a reverse current, i.e., the motor 17 will operate in a regenerative mode. This action will drive the link voltage above the desired level and cause the converter 11 to shut down. If such regenerative current is allowed to suddenly be applied at high levels, very large torque transients may occur. Furthermore, since the link voltage is above the commanded voltage, control of the motor may be lost resulting in slowing of the motor to undesirable low speeds. Of course, if motor speed is less than the commanded speed, the converter 11 may apply a higher DC link voltage causing inverter 15 to operate at a higher frequency again resulting in a torque transient being experienced by motor 17. Thus, it is desirable to be able to control excitation applied to a spinning AC motor so as to minimize torque transients and to quickly gain control of the motor.

Applicants' invention involves a modification of the initial starting operation of processor 19 with the introduction of a timed sweep of the volt-second command signal VS* while maintaining a fixed DC link voltage command signal V* at some preselected low value of approximately 5–10% of rated motor voltage. This starting modification enables the inverter 15 to come into frequency lock with an already spinning motor. The invention acts to gently achieve frequency lock consistent with the electrical frequency of the spinning motor rotor and then to bring the level of exciting flux to that required to support the command speed W*.

The present invention achieves this desirable result in a preferred embodiment by requiring that initial motor excitation be set at some pre-determined low value, for example, at approximately ten percent of the rated motor voltage. This level is chosen sufficiently small so that whether or not the motor is spinning, the resulting current flow is within rated conditions. At the same time, the volt-second set point command VS* is also initialized by controller 19 at a preselected low value which may also be, for example, at approximately 10% of its nominal value for the motor 17. Over a relatively brief time period, such as, for example, one second, controller 19 increases the volt-second set point to its nominal value. As the volt-second set point increases, the inverter frequency decreases. As the frequency decreases. A self-exciting condition occurs in the spinning motor. The low level of flux in the motor 17 generated by the low voltage on the DC link causes the motor to regenerate current to the DC link which charges the DC link capacitor 33 to a voltage above that commanded by the converter control. Since converter 11 is of a two-quadrant design, it can do nothing to remove this voltage and phases off. Any dynamic braking resistance in the system is disabled so as to allow the build up of capacitor voltage above that commanded. The continued reduction in inverter frequency brings the voltage on the capacitor 33 to that which is consistent with the motor's electrical frequency. As the volt-second set point increases, the motor flux level increases under this regenerative motor condition, thus increasing the capacitor voltage while the volt-second command adjusts inverter frequency to that consistent with the motor flux level at the motor electrical frequency. When the volt-second set point achieves its nominal value, frequency coordination is complete. The DC link voltage can then be increased in response to the speed command signal to bring motor speed to its desired value.

The coordinated increase of VS* and $V_{INV}$ is allowed to continue until one of three conditions is achieved. The first condition is that VS* reaches $VS_{NOM}$, i.e., the voltage command value of volt-seconds to achieve the desired volts per Hertz. Since this value of volts per Hertz establishes the desired flux in the motor, the motor electrical frequency can be determined by the voltage achieved at the inverter input terminals, i.e., the value of $V_{INV}$. This can be expressed as $$F_{INV} = (V_{INV}/V_{LIM}) * W_{CP}.$$

The second condition for ending the slew of VS* is that $V_{INV}$ reaches the rated voltage for the system, i.e., the voltage reaches $V_{LIM}$. At this condition the VS* command has not achieved $VS_{NOM}$ and the motor electrical frequency is determined by $F_{INV} = (VS_{NOM}/VS*) * W_{CP}$. It will be appreciated that in both these cases the desired starting condition for VS* and V* are determined to smoothly match the existing motor rotational and excitation levels. General commands can be acted upon by the system from these equilibrium starting conditions. The third condition for stopping the VS* slew is that excess motor curent is being generated due to reverse phase sequence of the inverter cell states, i.e., the cells or SCR's in the inverter are being gated into conduction in a sequence corresponding to a reverse direction of rotation of the motor. Once this condition is detected, the system must return to the initial low values of V* and VS* and begin the process of start-up again, but with opposite phase sequence.

Figure 2:
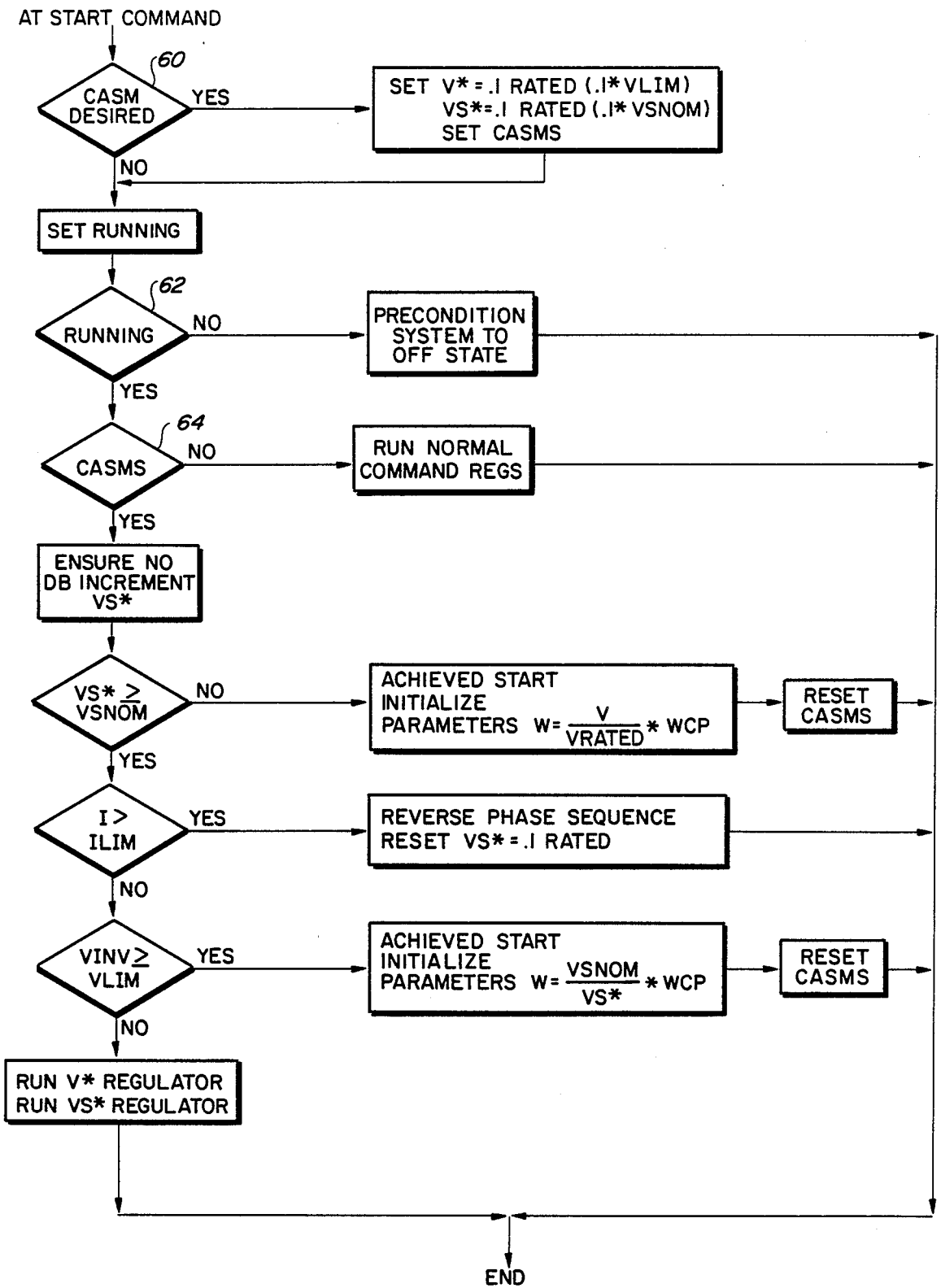
FIG. 2 contains a flow diagram illustrating the inventive method.

FIG. 2 is a simplified flow diagram for the inventive method of catching a spinning motor (CASM). When an initial start command is received, the system first evaluates whether or not it is asked to catch a spinning motor. This step is indicated at block 60. If the motor is not spinning, then a normal start sequence is initiated. If the motor is spinning, then the system sets the values of V* at 0.1 times rated value and VS* at 0.1 times its nominal value. The system also at this time sets a flag CASMS which allows the program to branch to the various functions described above as will become apparent.

It should be noted that the regulator system is interrupt driven, i.e., the program is cycled through at each clock time which, for this 60 hertz system, is at a rate of 2.77 msec. At each interrupt, the program starts at block 62 to determine if the regulator is running as indicated by a flag. If the system is powered, the block 64 checks to see if the CASMS flag is set. If the flag is not set then the normal program commands are executed. If the flag is set then the program enters into catch a spinning motor portion and begins by assuring that electrical dynamic breaking is disabled. VS* is then incremented to a first value and checks are begun to verify the three interrupt conditions discussed above, i.e., whether VS* is greater than or equal to $VS_{NOM}$, whether inverter current is greater than the current limit value or whether $V_{INV}$ is greater than or equal to $V_{LIM}$. If the first condition is true and the second two are false, then the V* and VS* regulator are run in their normal manner but with the values called for by the CASM routine. When VS* becomes less than $VS_{NOM}$, the routine determines that a successful start has been achieved and initializes the normal operating parameters, i.e., the value of W is set by $(V_{INV}V_{LIM})*W_{CP}$. Similarly, if $V_{INV}$ is greater than or equal to $V_{LIM}$ then start is achieved but in the constant horsepower range so that W is set at $(VS_{NOM}/VS*)*W_{CP}$. If current I is greater than Ilim, then a reverse phase sequence is assumed and the routine is exited and must be restarted. After a successful start, the CASMS flag is reset so that the regulator main program controls operation of the system using normal regulator parameters.

While the invention has been described in what is presently considered to be an embodiment, many modifications, variations and arrangements will become apparent to those skilled in the art. It is intended, therefore, that the invention not be limited to the disclosed embodiment but that it be given an interpretation commensurate with the appended claims.

We claim:

1. A method for catching a spinning motor with a volts per Hertz motor control system, the method providing a smooth transition to powered operation, the system being responsive to an externally generated speed command for establishing a volt-second set point for the motor, the method comprising the steps of:
    (a) initiating a volt-second set point at less than 15% of the motor's nominal set point;
    (b) commanding an initial excitation voltage which is less than 15% of the rated motor voltage;
    (c) applying the initial voltage to the motor at a relatively high frequency determined from the low volt-second set point;
    (d) incrementally increasing the volt-second set point up to the motor's nominal set point at a rate which causes the excitation frequency to decrease as the excitation voltage increases; and
    (e) determining when the volt-second set point reaches its nominal value and thereafter increasing the excitation voltage in correspondence with the speed command.

2. The method of claim 1 further comprising the steps of:
    (a) disabling dynamic braking until the volt-second set point reaches its nominal value.

3. A method for catching a spinning motor with a volts per hertz motor control system, the method providing a smooth transition to powered operation, the system being responsive to an externally generated speed command for establishing a volt-second set point for the motor, the method comprising the steps of:
    (a) initiating a volt-second set point at less than 15% of the motor's nominal set point;
    (b) commanding an initial excitation voltage which is less than 15% of the rated motor voltage;
    (c) applying the initial voltage to the motor at a relatively high frequency determined from the low volt-second set point;
    (d) incrementally increasing the volt-second set point up to the motor's nominal volt-second set point at a rate which causes the excitation frequency to decrease as the excitation voltage increases;
    (e) determining when the volt-second set point reaches its nominal value and thereafter increasing the excitation voltage in correspondence with the speed command;
    (f) determining whether rated motor current is exceeded as the volt-second set point is increased;
    (g) removing excitation voltage when the motor current exceeds rated current;
    (h) reversing the phase sequence of applied excitation to the motor; and
    (i) reinitiating the method.

4. The method of claim 3 further comprising the step of energizing the motor at full voltage and the present incremented value of the volt-second set point when the motor voltage reaches its rated value before the volt-second set point reaches its nominal value.

* * * * *